July 18, 1967  J. L. WHITE  3,331,692
PACKAGED MEAT PRODUCT
Filed June 29, 1964
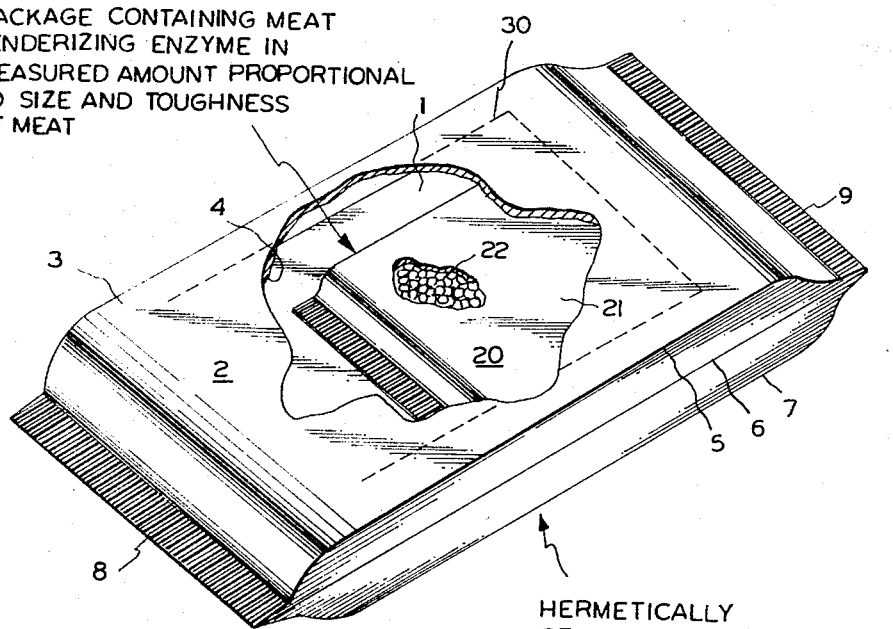
PACKAGE CONTAINING MEAT TENDERIZING ENZYME IN MEASURED AMOUNT PROPORTIONAL TO SIZE AND TOUGHNESS OF MEAT
HERMETICALLY SEALED PACKAGE CONTAINING FREEZE-DRIED FIBROUS MEAT
INVENTOR
JOHN L. WHITE

3,331,692
PACKAGED MEAT PRODUCT
John L. White, Fairfax County, Va.
(6302 Lakeview Drive, Falls Church, Va. 22041)
Filed June 29, 1964, Ser. No. 378,536
3 Claims. (Cl. 99—174)

ABSTRACT OF THE DISCLOSURE

Hermetically sealed packaged freeze dried normally tough cut of meat and associated measured amount of enzyme meat tenderizer in storably stable form.

---

This invention relates to a packaged meat product, more particularly packaged freeze-dried meat.

The invention resides in the novel combination of a storable package of a freeze-dried cut piece of meat whose fiber content renders the meat tough and chewy when reconstituted and cooked, in packaged association with a storable meat tenderizing enzyme in a measured amount with respect to the cut of meat capable of tenderizing the cut of meat to an acceptable degree when mixed with the reconstituting water and the reconstituted meat. The invention also resides in its more specific embodiments in novel packaging innovations useful in combination with this novel combination.

This invention is the result of combining the technologies of unrelated meat processing arts in a manner which solves problems associated with these arts as a result of the combination and physically embodying the combination into a novel article of manufacture, more particularly a packaged meat product.

The first meat processing art having a technological limitation or problem is tenderizing serving size cuts of fresh meat with meat tenderizing enzymes. It has long been known tougher cuts of meat can be tenderized with, e.g., the fruit enzymes, and products containing these enzyme-containing products for use by the consumer are available commercially. The main limitation or problem associated with the use of these enzymes by the consumer is the fact the enzyme does not become uniformly distributed through the cut of meat. Thus, certain areas of the meat, particularly the interior, remain tough and chewy whereas other areas, particularly the surface are over-tenderized and acquire an unpleasant texture and quality. Another problem associated with consumer use of enzyme tenderizers is the difficulty in determining the optimum amount of enzyme product to use with any particular cut of meat. Because enzyme activity which varies according to time and conditions of storage before use, the size and the degree of toughness of the cut of meat all are important factors in determining the degree of tenderization, there often results over- or under-tenderization with resulting consumer dissatisfaction. Maintaining constant enzyme activity in the enzyme-containing product, after the container is opened, until the product in the container is used up by the consumer also is an auxiliary problem.

The second meat processing art having a technological limitation or problem is the art of freeze-drying meat. Today, only the most tender cuts of the better grades of meat can satisfactorily be freeze-dried to produce a non-comminuted cut of meat which, when reconstituted with water, produces a cut of meat of acceptable tenderness to the consumer when it is cooked. Thus the cost of freeze-drying plus the cost of these premium cuts of meat makes the resultant freeze-dried product so expensive it has only a limited market despite the advantage of not requiring refrigeration during storage, its long storage life and the low cost of shipping, due to its light weight and its lack of necessity of refrigeration during shipment. Many approaches to solving this problem by treating the meat before or concomitant with freeze-drying have been investigated, with grinding, flaking or otherwise comminuting being the most common. This approach is unacceptable when a solid cut of meat is desired by the consumer.

The aforesaid problems associated with these two meat processing arts are solved by freeze-drying cuts of meat which when reconstituted and cooked would ordinarily be tough and chewy and packaging the freeze-dried cut of meat in a sealed package, formed of material suitable for storing the freeze-dried cut of meat without refrigeration, in combination with a measured amount of meat tenderizing enzyme in its storable inactive form, the selected amount being based upon enzyme activity of the selected enzyme, and the size, e.g., fresh weight, and toughness of the cut of meat in association therewith so as to produce an acceptable and preferably optimum degree of tenderization when the user mixes that measured amount of enzyme with the amount of water required to reconstitute the cut of meat, reconstitutes the meat thereby distributing the enzyme uniformly throughout the cut of meat, and then cooks the meat.

The proteinaceous meats which can be used with this invention include the enzyme-tenderizable flesh of animal, fowl and fish whose fiber, etc., content is such that a cut thereof when freeze-dried, reconstituted and cooked is tough and chewy to an undesirable degree. Thus cuts from stewing hens, roosters, sheep, horse-meat, bulls, swine as well as proteinaceous vegetables, e.g., mushrooms, can be used. However, this invention is primarily directed to the use of tougher and less expensive cuts of the higher grades of beef, e.g., comparable to U.S.D.A. choice and prime grades, such as flank and chuck steaks, chuck and shoulder roasts, neck, rib and other forequarter cuts, and the better cuts of the lower grades of beef, e.g., comparable to U.S.D.A. utility and good grades, e.g., the steak cuts, chuck and round roasts and other boneless cuts from range or commercial beef.

Because the tougher cuts of beef are relatively low in flavor-enhancing fat, in a preferred embodiment of this invention the packaged freeze-dried cut of meat has distributed in its additional storable fat, e.g., solid finely comminuted fat in excess of that naturally occurring in the cut of beef, such as, for example, waste fat from choice and prime beef. This fat can be added prior or subsequent to freeze drying, e.g., by injecting the fresh unfrozen meat with solid particulate fat by methods known in the art. A novel technique is to disperse in the individual cuts of meat before or after freeze drying, maintained at a temperature below the solidification of the selected fat, a mist of the melted fat at high pressure, so that the fat particles solidify upon deposition, e.g., using techniques used in needle-less hypodermic injection of medicaments in patients. Another involves impregnating the freeze-dried beef with an inert, tasteless solvent containing sufficient flavor enhancing fat to provide a total of about 6 to 9 percent fat in the reconstituted meat and then removing the solvent. Additionally or alternatively, commestible humectants can be dispersed in the meat or in association therewith to enhance the moistness of the reconstituted meat when cooked. Other techniques known in the art for upgrading the quality of the meat by aging, etc., can be used to improve the quality of the starting beef.

The cuts of meat used in this invention are non-comminuted, i.e., those which have not been reduced to small particle size. Although bite size pieces, e.g., stew meat, which ordinarily would be tough and chewy can be used, the invention is directed primarily to solid cuts of meat, e.g., steaks and roasts preferably between one-half and 3 inches thick, more preferably three-quarters to 2 inches thick.

The meat tenderizing enzymes which can be used include papain, bromelin, ficin, etc. There are now commercially available such enzymes sufficiently storable to be used by the consumer prior to cooking the meat. Papain is the enzyme most frequently used. These enzymes can be used in combination with cooking spices, e.g., one or more of salt, dehydrated garlic or onion powder, sodium pyrophosphate or other phosphate, monosodium glutamate, protein hydrolysate, either beef or plant, rendered beef fat and sugar. Such enzyme-containing combinations, particularly those containing an amount of salt sufficient to lightly salt the cut of meat when an acceptably tendering amount of enzyme is used on the meat, plus protein hydrolysate and/or storable fat, are particularly useful in the combination of this invention.

The packaging material used to form the novel packaged meat product can be any conventional material forming a substantially or completely moisture and desirably oxygen impervious package so as to prevent the meat from spoiling during storage, e.g., aluminum foil, polyethylene, polypropylene, paper laminated with aluminum foil or polyethylene. In one preferred embodiment, the packaging material is such as to form an at least semi-rigid package so that the package, when associated with appropriate opening means, forms a container which can be used to reconstitute the meat. Laminated paper and heavy duty aluminum foil are useful for this purpose. Desirably also when aluminum is used to form such a dual-purpose package, it is of a weight suitable to use as a cooking pan in which to cook the reconstituted meat. Such duel-purpose packages are preferably square or rectangular and flat faced top and bottom, e.g., with the top marked or scored to cut or tear an opening on the top large enough to remove the meat before or after cooking.

Because the measured amount of enzyme in association with the cut piece of meat in the package is used completely and immediately when the package is opened, loss of enzyme activity before use is a negligible problem. The enzyme preferably is sealed in its storable inactive form in a moisture and preferably oxygen free package formed of a packaging material impervious to moisture and water, e.g., aluminum foil. Because the freeze-dried meat preferably is sealed in a package substantially free from and impervious to moisture and air, the enzyme can be stored in the same package and in actual contact with the meat, e.g., distributed on its surface. However, preferably the enzyme is package separately from the meat in a second package which can be positioned on the interior of the meat package, e.g., in a paper envelope or sealed in aluminum, or affixed to the exterior, e.g., sealed in aluminum. When such a second package is used it preferably is formed of a packaging material suited to at least temporarily hold water and is of a size sufficient to hold the volume of water required to reconstitute the piece of meat in the associated package so as to provide a measuring device for the user to measure the correct amount of water to reconstitute the meat while at the same time dissolving or dispersing the enzyme in the reconstituting water. This embodiment is particularly preferred because it is a fundamental requirement that the enzyme be distributed uniformly throughout the meat concomitantly with the reconstituting water. Using the enzyme package as the reconstituting water measuring device precludes the possibility of the user inadvertently adding the reconstituting water to the meat before adding the enzyme thereto.

A specific embodiment of the invention is shown in the figure of the drawing in which a freeze-dried piece of fibrous meat 1 is packaged in a hermetically sealed package 2 formed of laminated paper 3 having aluminum foil 4 as its innermost lamina. The laminated paper 3 is creased longitudinally at 5, 6 and 7 to form a flat faced top and bottom rectangular package. The package is sealed transversely at its ends 8 and 9. Contained within the package 2 is a second package 20 formed of wet strength paper 21 and containing an amount of papain enzyme 22 measured in proportion to enzyme activity and the size of the piece of meat 1 and its toughness to provide an acceptable degree of tenderization of the meat when reconstituted. The second package 20 is of a size sufficient to hold the volume of water required to reconstitute the piece of meat. One face of the package 2 bears indicia 30 indicating the manner in which the package should be opened so the opened package can be used as a container to reconstitute the meat.

In using the embodiment of the invention shown in the drawing, the user cuts open the package 2 following indicia 30, removes the inner package 20, opens and fills the package 20 to the level indicated by indicia on the face of that package with the reconstituting water, thereby distributing the enzyme throughout the reconstituting water. The enzyme-containing water is then poured into the package 2 and the meat permitted to stand until reconstituted, usually 10 minutes to one-half hour. If longer times are employed, substantial tenderizing action will commence before cooking. However, with most enzymes the major portion of the tenderizing occurs during the first stages of cooking.

As an example of this invention, one pound one inch thick boneless sirloin steak from a commercial grade of steer beef is freeze-dried by conventional procedures. Prior to freeze drying the steak is uniformly fortified with beef fat to a 7 percent level. The freeze-dried beef is hermetically sealed in a paper-aluminum foil laminate package of the type shown in FIG. 1 in a nitrogen atmosphere along with an envelope, of a liquid volume equal to the volume of liquid removed from the steak in freeze drying, containing 0.5 tsp. of Adolph's brand of papain meat tenderizer or equivalent amount of papain enzyme alone. The resulting product is storage without refrigeration. When the envelope containing the enzyme is filled with water and the contents dissolved therein, the resultant solution reconstitutes the meat and the reconstituted meat is uniformly tenderized when cooked.

What is claimed is:

1. A package meat product comprising (a) a cut piece of freeze-dried comestible non-comminuted proteinaceous meat, of a fiber content which renders the meat tough and chewy in its reconstituted and cooked form, hermetically sealed in a container provided with access means and formed of a packaging material such that the container can be used for reconstituting the meat when the package is opened using said access means, and (b) a measured amount of a meat tenderizing enzyme in a storable inactive form, in packaged relationship with said piece of meat in said package, said measured amount of tenderizer being an amount which tenderizes the piece of meat in packaged combination therewith to an acceptable degree when the enzyme is distributed in water used to reconstitute the meat and the meat cooked.

2. A package meat product comprising (a) a hermetically sealed first package containing therein a cut piece of freeze-dried comestible non-comminuted beef, of a fiber content which renders the cut of meat tough and chewy when reconstituted and cooked, said first package being provided with access means and formed of a packaging material such that the package can be used as a container to reconstitute the meat when the package is opened using said access means, and (b) a second package containing a measured amount of a meat tenderizing enzyme in a storable inactive form, said second package being capable of holding a volume of water sufficient to reconstitute the piece of meat and formed of a packaging material suited to at least temporarily hold water, and said measured amount of enzyme being an amount which tenderizes the cut of meat in combination therewith to an acceptable degree when the enzyme is distributed in the water used to reconstitute the meat and the meat cooked.

3. A packaged meat product comprising a first, hermetically sealed package containing therein (a) a cut piece of freeze-dried comestible non-comminuted beef, of a fiber content when renders the cut of meat tough and chewy when reconstituted and cooked, said first package being fabricated of at least semi-rigid aluminum having a face provided with access means which, when used to open the package, converts the package into a container suitable for reconstituting and cooking the meat, and (b) a second package containing a measured amount of a meat tenderizing enzyme in a storable inactive form sufficient to tenderize the cut of meat to an acceptable degree when the enzyme is distributed throughout the meat with water used to reconstitute the cut of meat and the cut of meat thereafter cooked, said second package being of a size capable of holding a volume of water sufficient to reconstiute the piece of meat and being formed of a packaging material suited to at least temporarily hold water.

References Cited
UNITED STATES PATENTS

| | | | |
|---|---|---|---|
| 2,072,955 | 3/1937 | Lunt | 99—174 |
| 2,424,536 | 7/1947 | Mayer et al. | 99—174 |
| 2,741,559 | 4/1956 | Banowitz | 99—171 |
| 2,758,932 | 8/1956 | Scott | 99—171 |
| 2,811,454 | 10/1957 | Pressman | 99—174 X |
| 2,825,652 | 3/1958 | Berkowitz | 99—174 X |
| 2,899,318 | 8/1959 | Long | 99—171 X |
| 3,165,416 | 1/1965 | Sleeth et al. | 99—208 X |
| 3,215,534 | 11/1965 | Baum | 99—107 |
| 3,228,776 | 1/1966 | Savage et al. | 99—171 |

HYMAN LORD, *Primary Examiner.*